March 20, 1945.    V. E. SMITH    2,372,028

COUNTERBORING TOOL WITH PILOT AND HOLDER

Filed Dec. 3, 1943

INVENTOR.
Victor E. Smith
BY
ATTORNEYS.

Patented Mar. 20, 1945

2,372,028

UNITED STATES PATENT OFFICE 2,372,028

COUNTERBORING TOOL WITH PILOT
AND HOLDER

Victor E. Smith, Detroit, Mich., assignor to
Mildred E. Smith, Detroit, Mich.

Application December 3, 1943, Serial No. 512,827

8 Claims. (Cl. 77—58)

The present invention relates to cutting assemblies requiring a pilot to guide the tool into the work, which has previously been provided with a hole for accommodating the pilot.

In the past it has been proposed to provide such assemblies where the pilot rod, by screw threaded connection with the socket holder, assists in holding the cutter in the latter. These have been found objectionable because it is necessary to first unscrew the pilot rod before the cutter can be removed from the socket, and much time is lost and parts are subjected to considerable wear, if different cutters must frequently be applied to and removed from the socket holder.

It has also been proposed to support the pilot by the cutter so that it may be removed therewith, and to provide a recess at the inner end of the socket of the holder to accommodate the pilot rod as the effective length of the cutter is reduced, due to wear and resharpening. Such arrangement also makes necessary, in many instances, the removal of the pilot rod before the cutter can be forced from the socket by use of a tapered releasing element accommodated in a transverse way in the socket holder. After a few grinding operations, to recondition a worn cutter, the inner end of the pilot rod intersects this transverse way and hence the releasing tool cannot be effectively used until after the pilot rod has been unscrewed sufficiently to be out of the way of such releasing tool.

The principal objects of the present invention are to provide a cutting assembly which is inexpensive to manufacture, efficient in operation, and readily dismembered in whole or in part.

Another object is to provide an assembly whereby the pilot rod is removable with the cutter, and in no way interferes with use of a tapered releasing element accommodated in a transverse way in the socket holder, even though the cutter has been resharpened to the extent where its effective life, so to speak, is ended.

Another object is to provide an assembly whereby the pilot rod may be removed from the cutter without removing the latter from the socket holder.

A further object is to provide an assembly of cutter and pilot in which the latter includes a nut accommodated in an axial bore of the cutter and a headed pilot rod, the shank portion of which is in threaded engagement with the nut, the latter being of softer metal than the pilot rod, whereby the nut may have a forced fit in the bore of the cutter and will be the element damaged, instead of the pilot rod, if the latter should become stuck in the work as the cutter assembly rotates.

Other objects and advantages of the invention will appear in the following detailed description, taken in connection with the accompanying drawing, forming a part of this specification, and in which drawing.

Figure 1:
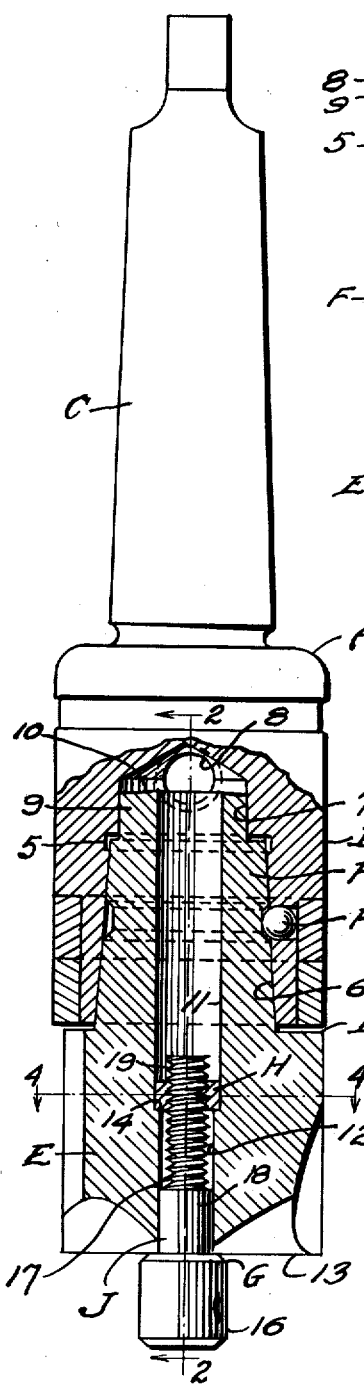
Fig. 1 is a view partly in elevation and partly in central vertical section through an assembly made according to the present invention.
Figure 2:
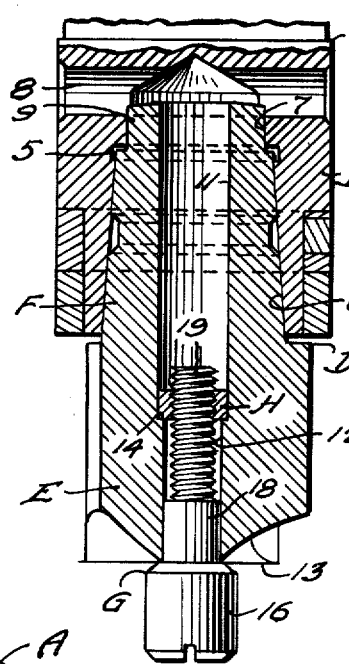
Fig. 2 is a vertical sectional view on the line 2—2 of Fig. 1.

In the drawing A designates a tool holder including a socket portion B and a shank C for insertion in a suitable chuck or other driving means, not shown; D a cutting tool including a head E and a shank F for insertion into the socket portion B to form a driving connection therewith; and G a pilot including a nut H and a pilot rod J. In the example shown the tool holder A is equipped with a cutting tool retainer K disclosed and claimed in my copending application for patent, filed Dec. 3, 1943, Serial No. 512,826.

The tool holder A, in the example shown, is made so as to have both a frictional-wedging and a positive driving connection with the tool D, but this is not essential, insofar as the present invention is concerned, the characteristics of the driving connection being disclosed and claimed in my copending application for patent filed Dec. 3, 1943, Serial No. 512,825.

The socket portion B has a tool shank receiving bore 5 tapering as at 6 for a major portion of its length from the open end and coaxial with the shank C; and an inner cylindrical portion 7 eccentric to the tapering portion 6 with its axis parallel to the common axis of shank C and tapering portion 6. A transverse hole 8 is provided through the walls of the socket portion B, adjacent the inner end of bore 5, affording a way intersecting the latter, for accommodating any convenient cutter releasing element (not shown in the drawing), similar to a tapered center punch, usually used to release the shank of the tool from the socket.

The shank F of the cutting tool D includes a terminally located eccentric cylindrical portion 9 to telescope into the portion 7 of bore 5 and constitutes the positive driving connection above referred to. The end of this portion 9 may have a chamfered edge 10 to more readily coact with the tapered releasing element hereinbefore referred to. It will be noted that the shank F is of a length to partially intersect the way of hole 8 when the cutter is inserted in the tool holder and that if anything carried by the cutter projects beyond the end of its shank F, such would interfere with use of a releasing element driven crosswise of the shank through the hole 8.

The cutting tool D, in the example shown, is provided with an axial major bore 11 open to the free end of shank F and a minor bore 12 of smaller diameter than bore 11 and coaxial therewith, and open to the leading end 13 of the cutter, providing an annular shoulder 14 at the juncture of the major and minor bores.

It is on shoulder 14 that the nut H seats. It is preferred, in order to reduce the cost of manufacture, to make the bores 11 and 12, round in cross section and to feed the nut H in at the open end of bore 11, so as to have a forced fit therein and against shoulder 14, and to make the nut H of softer metal than the pilot rod J whereby it will yield, and will be the element damaged, if the pilot rod should become stuck in the work as the cutter rotates.

Figure 3:
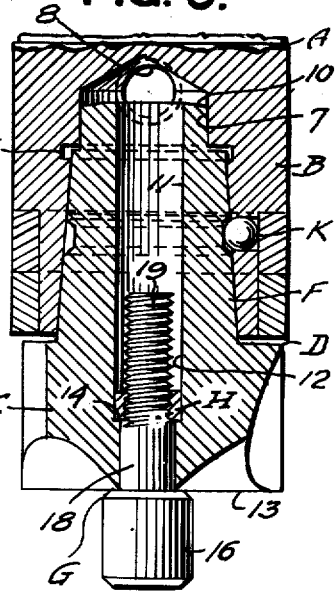
Fig. 3 is a fragmentary view mostly in vertical section, but partly in elevation, similar to the lower portion of Fig. 1, but showing the relative position of the parts after the cutter has been worn and sharpened a number of times, and the assembly is in readiness for further use.
Figure 4:
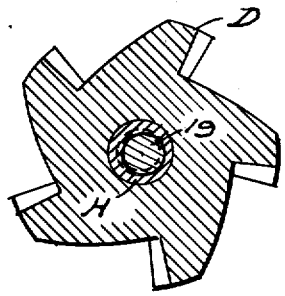
Fig. 4 is a cross sectional view on the line 4—4 of Fig. 1.
Figure 4:
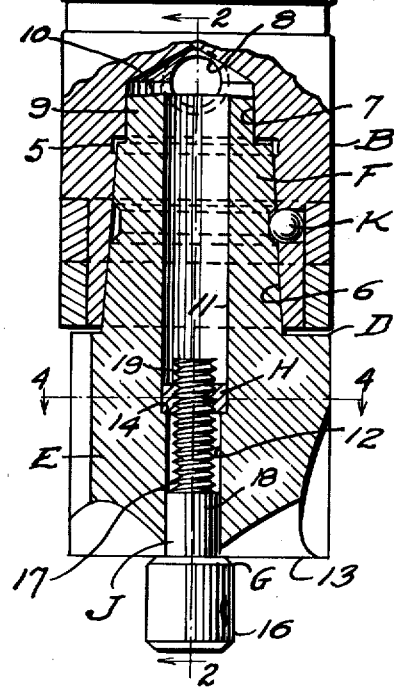

The pilot rod includes a head 16 for engagement with the leading end 13 of the cutter, and a shank 17 of considerably less length than the combined length of bores 11 and 12. The shank is provided with a smooth portion 18 next adjacent to head 16 for intimate contact with the wall of the bore 12, and a threaded terminal portion 19 for threaded engagement with nut H. By this arrangement the pilot rod is steadied in the cutter by the smooth portion 18 in intimate contact with the wall of bore 12, and the overall length of the shank 17 is not so great as to permit the shank to project beyond the free end of shank F of the cutter even when the head E has been ground down to a considerable extent, as shown in Fig. 3, for rendering it sharp.

The location of shoulder 14 and hence nut H may be at any suitable zone in the length of the axial bore in the cutting tool, so long as it affords anchorage for the pilot rod when the cutter is new as well as when its effective life is about ended. Also, the length of the shank 17, while considerably shorter than the length of the axial bore of the cutter, may be such that its free end just reaches the plane of the chamfered edge 10, when the tool has reached the end of its usefulness as a cutter, thereby in no way interfering with the use of the tapered cutter releasing element hereinbefore referred to.

The cutting tool retainer K forms no part of the invention herein claimed and is not essential to the combination of the arrangement of holder, cutting tool and pilot, and is fully disclosed in the aforesaid application Serial No. 512,826. It, however, enables a workman to ease the cutting tool from the holder by use of the releasing element, but prevents the cutting tool from accidently dropping from the holder which might otherwise injure the cutting flutes of the tool by impact with some solid object.

I claim:

1. In a device of the character described, the combination of a holder, a cutter including a tapered shank and a head, and a pilot for the cutter; said holder including a socket portion provided with a bore tapered for at least a portion of its length and a transverse hole extending through the walls of the socket portion affording a transverse way intersecting the bore adjacent the inner end thereof, adapted to receive a cutter releasing element; said cutter shank adapted for wedging engagement in said holder bore and of a length to partially intersect said way when inserted in said bore, and said cutter provided with an axial major bore open to the free end of its shank and a minor bore of smaller diameter than said major bore and coaxial therewith, and open to the leading edge of the cutter, providing an annular shoulder at the juncture of said major and minor bores; and said pilot comprising a nut in said major bore engaging said shoulder, and a pilot rod including a head for engagement with the leading edge of the cutter and a shank of considerably less length than the combined length of said major and minor bores, and provided with a smooth portion for intimate contact with the wall of said minor bore and a threaded portion for threaded engagement with said nut, whereby the nut may be placed in the major bore against said shoulder by entrance at the open end of the major bore, and the threaded portion of the pilot rod shank is in part accommodated in said major bore throughout the effective life of the cutter, so as to not interfere with use of a cutter releasing element in said transverse way of the holder, and whereby the pilot rod may be removed from the cutter without removing the latter from the holder.

2. In a device of the character described, the combination of a holder, a cutter including a tapered shank and a head, and a pilot for the cutter; said holder including a socket portion provided with a bore tapered for at least a portion of its length and a transverse hole extending through the walls of the socket portion affording a transverse way intersecting the bore adjacent the inner end thereof, adapted to receive a cutter releasing element; said cutter shank adapted for wedging engagement in said holder bore and of a length to partially intersect said way when inserted in said bore, and said cutter provided with an axial major bore open to the free end of its shank and a minor bore of smaller diameter than said major bore and coaxial therewith, and open to the leading edge of the cutter, providing an annular shoulder at the juncture of said major and minor bores; and said pilot comprising a nut in said major bore engaging said shoulder, and a pilot rod including a head for engagement with the leading edge of the cutter and a shank of considerably less length than the combined length of said major and minor bores, and provided with a threaded portion for threaded engagement with said nut, whereby the nut may be placed in the major bore against said shoulder by entrance at the open end of the major bore, and the threaded portion of the pilot rod shank is in part accommodated in said major bore throughout the effective life of the cutter, so as to not interfere with use of a cutter releasing element in said transverse way of the holder, and whereby the pilot rod may be removed from the cutter without removing the latter from the holder.

3. In a device of the character described, the combination of a holder, a cutter including a tapered shank and a head, and a pilot for the cutter; said holder including a socket portion provided with a bore tapered for at least a portion of its length and a transverse hole extending through the walls of the socket portion affording a transverse way intersecting the bore adjacent the inner end thereof, adapted to receive a cutter releasing element; said cutter shank adapted for wedging engagement in said holder bore and of a length to partially intersect said way when inserted in said bore, and said cutter provided with an axial major bore open to the free end of its shank and a minor bore of smaller diameter than said major bore and coaxial therewith, and open to the leading edge of the cutter, providing a shoulder at the juncture of said major and minor bores; and said pilot comprising a nut in said major bore engaging said shoulder, and a pilot rod including a head for engagement with the leading edge of the cutter and a shank of considerably less length than the combined length of said major and minor bores, and provided with a smooth portion for intimate contact with the wall of said minor bore and a threaded portion for threaded engagement with said nut, whereby the nut may be placed in the major bore against said shoulder by entrance at the open end of the major bore, and the threaded portion of the pilot rod shank is in part accommodated in said major bore throughout the effective life of the cutter, so as to not interfere with use of a cutter releasing element in said transverse way of the holder, and whereby the pilot rod may be removed from the cutter without removing the latter from the holder.

4. In a device of the character described, the combination of a cutter including a head and a shank, and a pilot for the cutter including a pilot rod and a nut, said cutter provided with an axial major bore open to the free end of its shank, and a minor bore of smaller diameter than said major bore and coaxial therewith, and open to the leading end of the cutter, providing an annular shoulder at the juncture of said major and minor bores; the pilot rod including a head for engagement with the leading end of the cutter and a shank of considerably less length than the combined length of said major and minor bores, and provided with a smooth portion for intimate contact with the wall of said minor bore, and a threaded end portion for threaded engagement with said nut, and said nut being seated on said annular shoulder and having a forced fit in said major bore.

5. In a device of the character described, the combination of a cutter including a head and a shank, and a pilot for the cutter including a pilot rod and a nut, said cutter provided with an axial major bore open to the free end of its shank, and a minor bore of smaller diameter than said major bore and coaxial therewith, and open to the leading end of the cutter, providing a shoulder at the juncture of said major and minor bores; the pilot rod including a head for engagement with the leading end of the cutter and a shank of considerably less length than the combined length of said major and minor bores, and provided with a smooth portion for intimate contact with the wall of said minor bore, and a threaded end portion for threaded engagement with said nut, and said nut being non-rotatably seated on said shoulder.

6. In a device of the character described, the combination of a cutter including a head and a shank, and a pilot for the cutter including a pilot rod and a nut, said cutter provided with an axial major bore open to the free end of its shank, and a minor bore of smaller diameter than said major bore and coaxial therewith, and open to the leading end of the cutter, providing an annular shoulder at the juncture of said major and minor bores; the pilot rod including a head for engagement with the leading end of the cutter and a shank of considerably less length than the combined length of said major and minor bores, and provided with a smooth portion for intimate contact with the wall of said minor bore, and a threaded end portion for threaded engagement with said nut, said nut being seated on said shoulder and having a forced fit in said major bore, and said nut being of softer metal than said pilot rod whereby the thread of the nut will strip should the pilot become stuck in the work as the cutter rotates or is retracted from the work.

7. In a device of the character described, the combination of a cutter including a head and a shank, and a pilot for the cutter including a pilot rod and a nut, said cutter provided with an axial bore open at the free end of the shank and the leading end of the head; the pilot rod including a head for engagement with the leading end of the cutter and a shank of considerably less length than the length of said bore and provided with a threaded end portion for threaded engagement with said nut, and said nut having a forced fit within said bore remote from the ends thereof.

8. In a device of the character described, the combination of a cutter including a head and a shank, and a pilot for the cutter including a pilot rod and a nut, said cutter provided with an axial bore open at the free end of the shank and the leading end of the head; the pilot rod including a head for engagement with the leading end of the cutter and a shank of considerably less length than the length of said bore and provided with a threaded end portion for threaded engagement with said nut, and said nut being of softer metal than said pilot rod and having a forced fit in said bore remote from the ends of the bore whereby the thread of the nut will strip should the pilot become stuck in the work as the cutter rotates.

VICTOR E. SMITH.